US012601962B2

(12) United States Patent
Nakajima et al.

(10) Patent No.: US 12,601,962 B2
(45) Date of Patent: Apr. 14, 2026

(54) PROJECTOR

(71) Applicant: SEIKO EPSON CORPORATION, Tokyo (JP)

(72) Inventors: Takashi Nakajima, Azumino (JP); Yoshinori Hashimoto, Okaya (JP); Toshimitsu Watanabe, Matsumoto (JP); Nobuyuki Otsuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 477 days.

(21) Appl. No.: 18/170,625

(22) Filed: Feb. 17, 2023

(65) Prior Publication Data

US 2023/0266646 A1 Aug. 24, 2023

(30) Foreign Application Priority Data

Feb. 18, 2022 (JP) ................................. 2022-023580

(51) Int. Cl.
 *G03B 21/14* (2006.01)

(52) U.S. Cl.
 CPC ......... *G03B 21/142* (2013.01); *G03B 21/145* (2013.01)

(58) Field of Classification Search
 None
 See application file for complete search history.

(56) References Cited

U.S. PATENT DOCUMENTS

| | | | |
|---|---|---|---|
| 2010/0052926 A1 | 3/2010 | Oku | |
| 2013/0050657 A1 | 2/2013 | Morohoshi | |
| 2015/0378247 A1* | 12/2015 | Otsuki | ................. H04N 9/3141 |
| | | | 353/101 |
| 2019/0219906 A1 | 7/2019 | Kase | |
| 2021/0218941 A1 | 7/2021 | Otsuki | |

FOREIGN PATENT DOCUMENTS

| | | |
|---|---|---|
| CN | 110045566 A | 7/2019 |
| JP | 2010-055394 A | 3/2010 |
| JP | 2013050478 A | 3/2013 |
| JP | 2021110858 A | 8/2021 |

* cited by examiner

*Primary Examiner* — Bao-Luan Q Le
*Assistant Examiner* — Danell L Owens
(74) *Attorney, Agent, or Firm* — Dority & Manning, P.A.

(57) ABSTRACT

A projector includes: an exterior casing having a first wall section; a projection optical part accommodated in the exterior casing and having a lens group projecting image light onto a projection surface; a focus lever moving a position of the lens group; a power switch being pressed to generate a control signal; and a coupling terminal electrically coupled to a cable transmitting an electrical signal. The focus lever, the power switch, and the coupling terminal are arranged at the first wall section.

6 Claims, 14 Drawing Sheets

PROJECTOR

The present application is based on, and claims priority from JP Application Serial Number 2022-023580, filed Feb. 18, 2022, the disclosure of which is hereby incorporated by reference herein in its entirety.

BACKGROUND

1. Technical Field

The present disclosure relates to a projector.

2. Related Art

JP-A-2013-50478 discloses a projector including: an operation unit having a plurality of press buttons including a power button; a connector unit having a coupling terminal to which an external device is coupled; and a focus adjustment lever adjusting the focal position of a projection lens. The operation unit, the connector unit, and the focus adjustment lever are arranged at different faces from each other of a casing.

JP-A-2021-110858 discloses a projector in which an operation unit adjusting the focus state of an image is arranged at a face section that is one lateral face of a casing unit.

However, in the projector described in JP-A-2013-50478, the operation unit, the connector unit, and the focus adjustment lever are arranged at different faces of the casing. Therefore, this projector has a problem in that it is not user-friendly.

Similarly, with respect to the projector described in JP-A-2021-110858, there is no disclosure that a connector unit having a coupling terminal to which an external device is coupled or an operation button or the like for operating a function of the projector is provided at the same face section as the operation unit for operating a lens. Therefore, this projector has a problem in that it is not user-friendly.

SUMMARY

A projector includes: an exterior casing having a plurality of wall sections including a first wall section; a projection part accommodated in the exterior casing and having a lens group projecting image light onto a projection surface; a focus lever moving a position of the lens group; a press button being pressed to generate a control signal; and a coupling terminal electrically coupled to a cable transmitting an electrical signal. The focus lever, the press button, and the coupling terminal are arranged at the first wall section.

BRIEF DESCRIPTION OF THE DRAWINGS

FIG. 7 is a side view showing the configuration of an operation unit.

DESCRIPTION OF EXEMPLARY EMBODIMENTS

Figure 1:
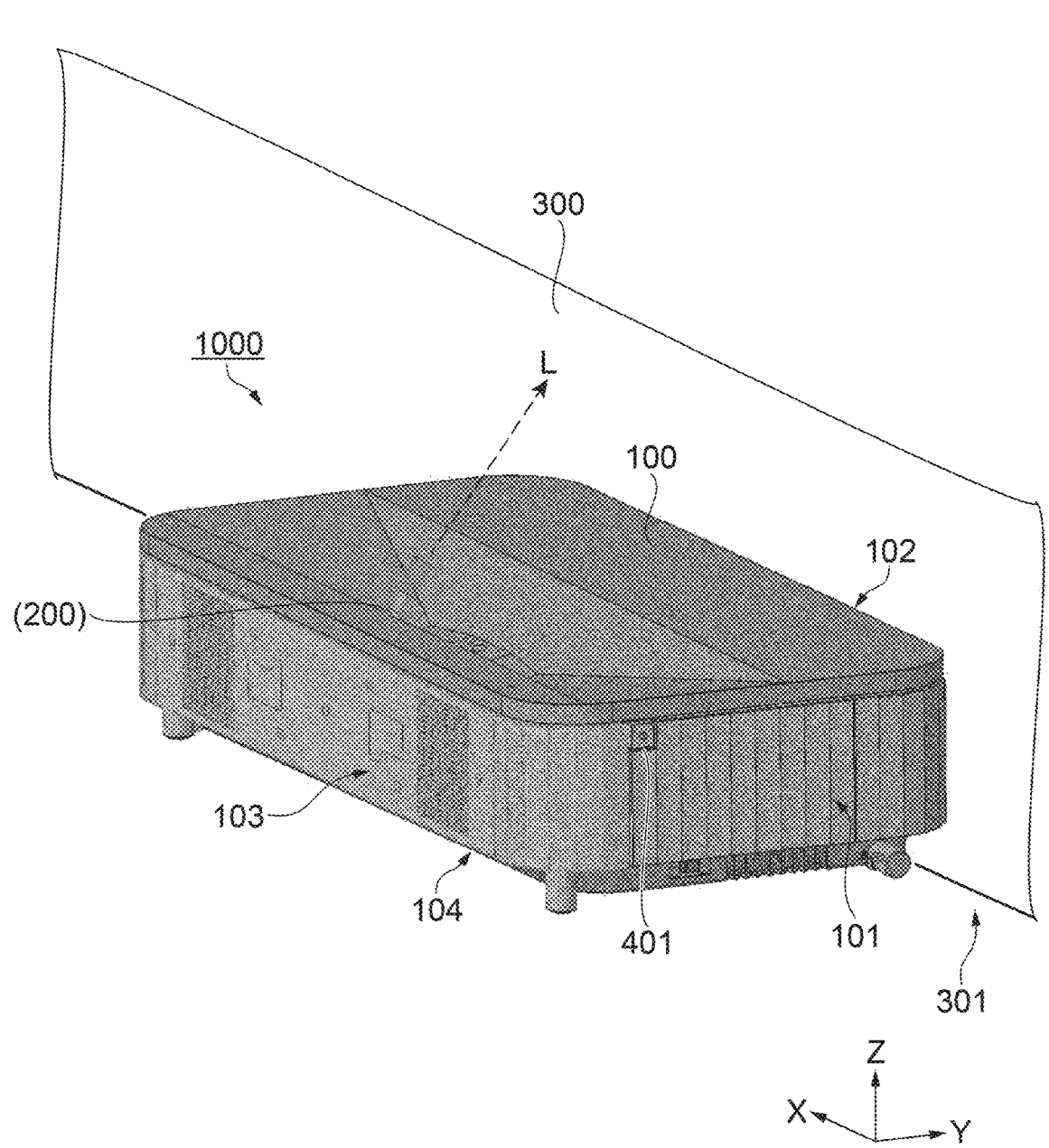
FIG. 1 is a perspective view showing the configuration of a projector.

In the drawings described below, an X-axis, a Y-axis, and a Z-axis are given as three axes that are orthogonal to each other. A direction along the X-axis is referred to as an "X-direction". A direction along the Y-axis is referred to as a "Y-direction". A direction along the Z-axis is referred to as a "Z-direction". A direction indicated by an arrow is referred to as a + direction. A direction opposite to the + direction is referred to as a − direction. The +Z-direction may also be referred to as "up" or "above". The −Z-direction may also be referred to as "down" or "below". A view from the +Z-direction may also be referred to as a plan view or planar. A surface on the + side in the Z-direction is described as a top surface. A surface on the − side in the Z-direction, which is opposite to the top surface, is referred to as a bottom surface.

First, the configuration of a projector 1000 will be described with reference to FIGS. 1 to 4.

Figure 2:
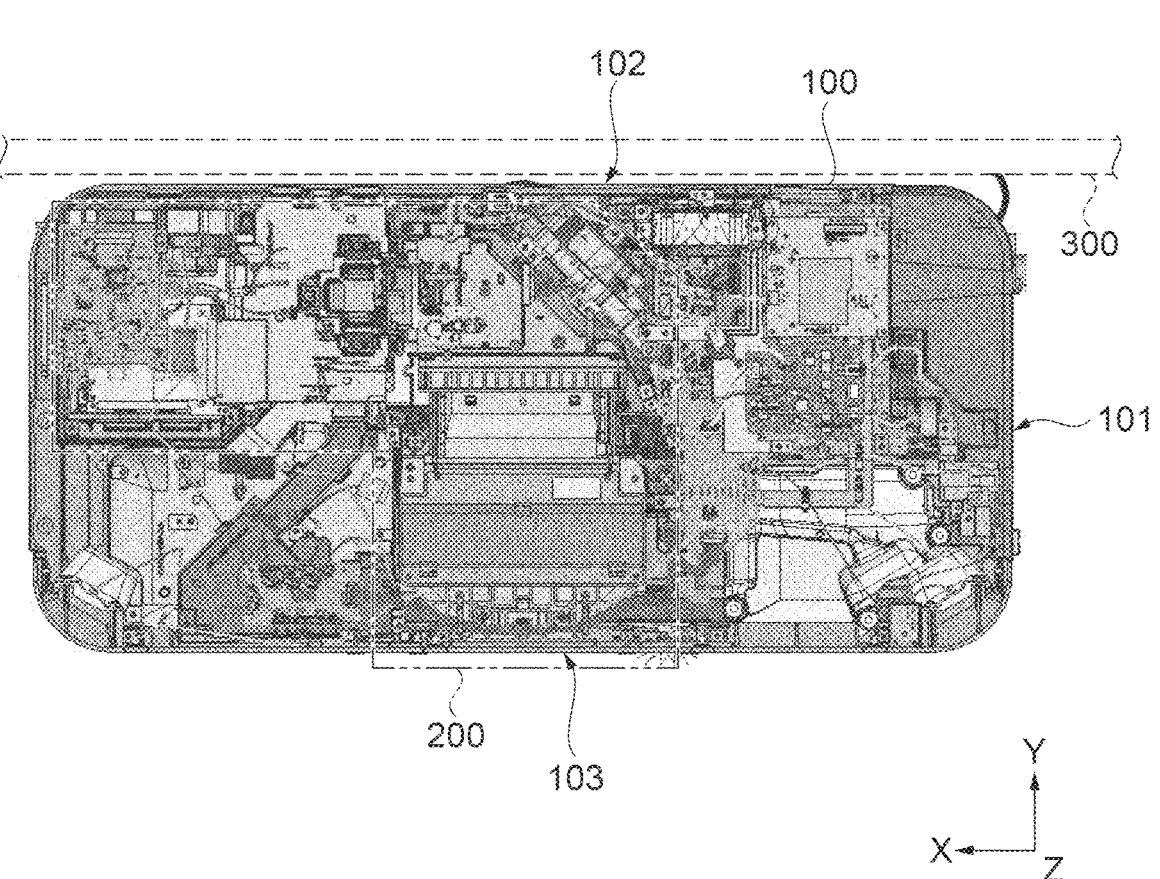
FIG. 2 is a plan view showing the internal configuration of the projector.

As shown in FIGS. 1 and 2, the projector 1000 is, for example, a short focus projector 1000 and has an exterior casing 100 and a projection part 200 accommodated in the exterior casing 100. Image light L projected from the projection part 200 is projected onto a projection surface 300. The short focus projector 1000 includes a folded type and a concave mirror type.

The exterior casing 100 has a first wall section 101, a second wall section 102 facing the projection surface 300, a third wall section 103 opposite to the second wall section 102, and a fourth wall section 104 facing an installation surface 301 where the first wall section 101, that is, the projector 1000, is installed. The first wall section 101 is a wall section that does not face the projection surface 300 and that intersects the second wall section 102, the third wall section 103, and the fourth wall section 104.

Figure 3:
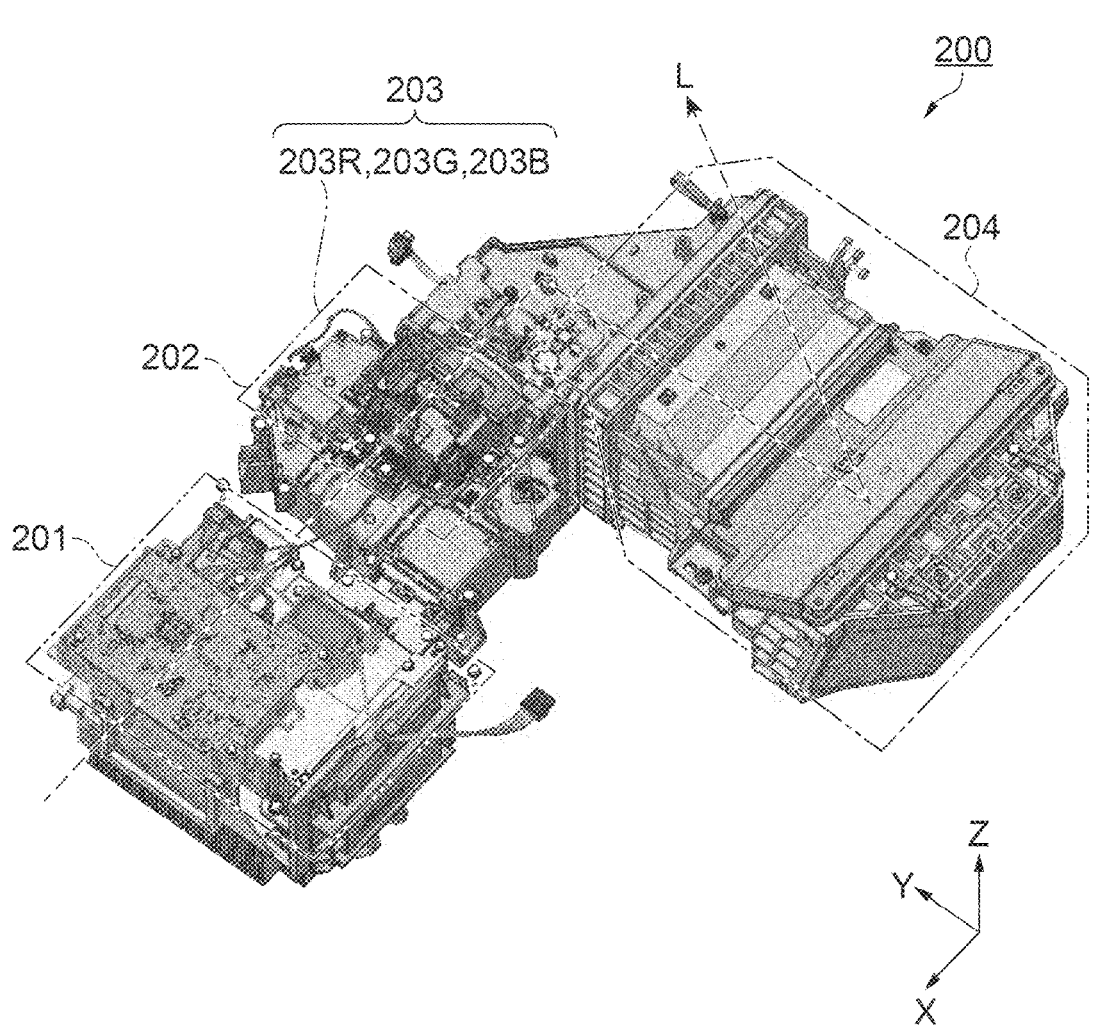
FIG. 3 is a perspective view showing the configuration of a projection part.

As shown in FIG. 3, the projection part 200 has a light source unit 201, a light-guiding optical unit 202, an image forming unit 203, and a projection optical unit 204 as a projection section. The light source unit 201, the light-guiding optical unit 202, the image forming unit 203, and the projection optical unit 204 are arranged along a system optical axis (image light L).

The light source unit 201 includes, for example, a lamp unit including a light source formed of a white light source such as an ultra-high-pressure mercury lamp or a halogen lamp, an integrator lens, and a polarization conversion element. The light source may be a solid-state light source such as a semiconductor laser. The polarization conversion element has a function of making uniform a P-polarized light component and an S-polarized light component emitted from the light source.

The light-guiding optical unit 202 includes, for example, a dichroic mirror as a light separation element, a reflection mirror, and a relay lens.

The image forming unit 203 is a section generating the image light L from the light emitted from the light source unit 201 and has liquid crystal panels 203R, 203G, 203B as three light modulation panels and a cross dichroic prism as a light combining element.

Figure 4:
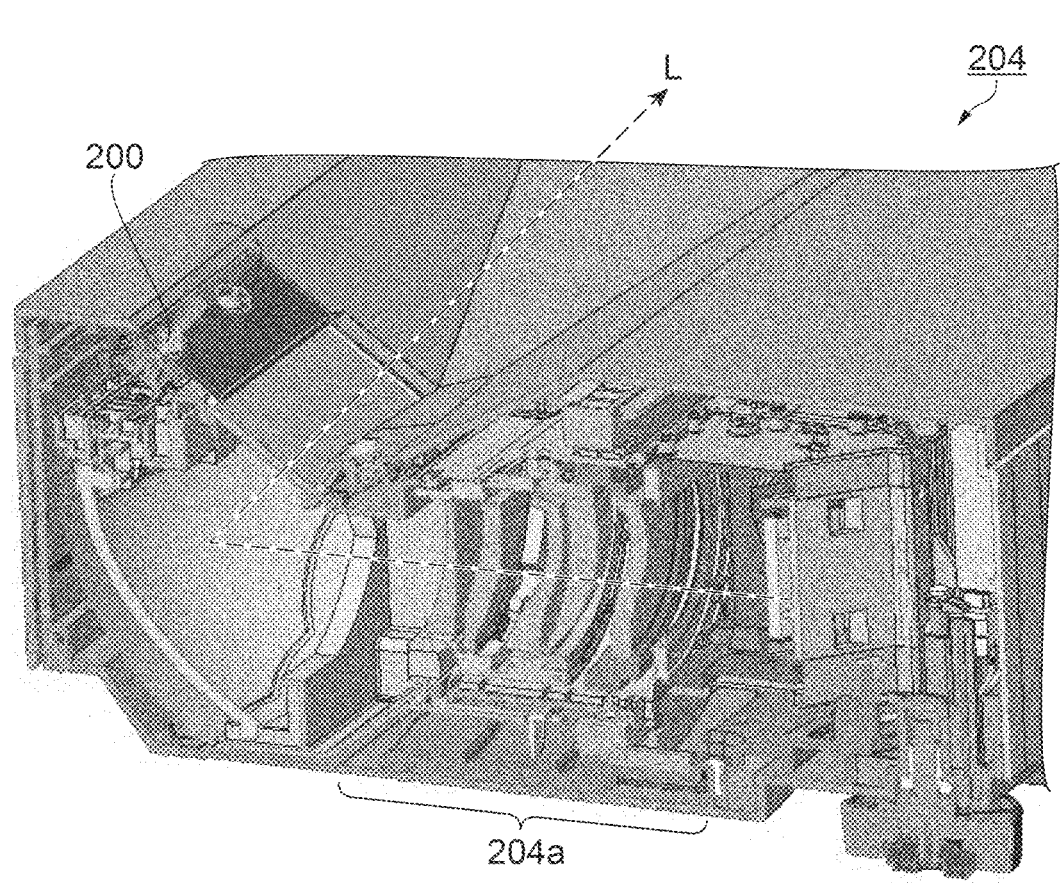
FIG. 4 is a perspective view showing the configuration of a projection optical unit.
Figure 4:
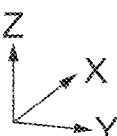

The projection optical unit 204 has a lens shift mechanism or the like and is attached to the exterior casing 100. The combined image light L is projected onto the projection surface 300 by the projection lens and thus causes an image to be displayed in an enlarged form. As shown in FIG. 4, a reflection mirror for reflecting the image light L and a lens group 204a having a plurality of lenses are arranged in the projection optical unit 204.

A cover 400 attached to the exterior casing 100 will now be described with reference to FIGS. 5 and 6.

Figure 5:
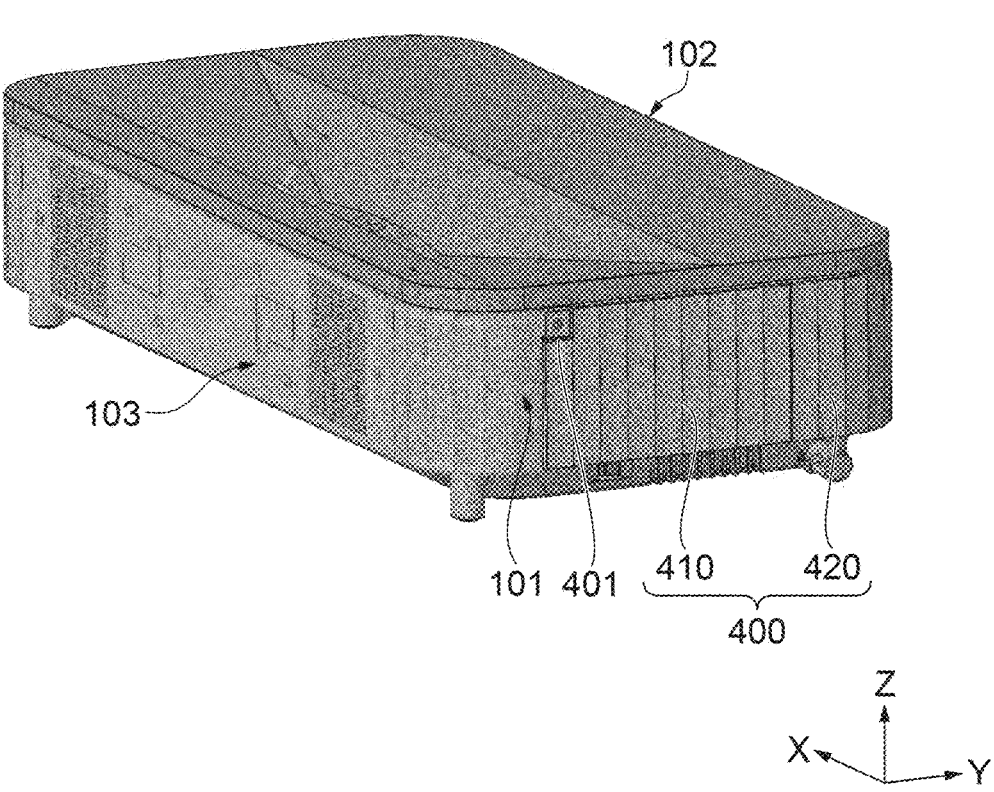
FIG. 5 is a perspective view showing the configuration of the projector.

As shown in FIG. 5, the exterior casing 100 has the first wall section 101, the second wall section 102, and the third wall section 103, as described above. The cover 400, which is removable, is attached to the first wall section 101 of the exterior casing 100.

Figure 6:
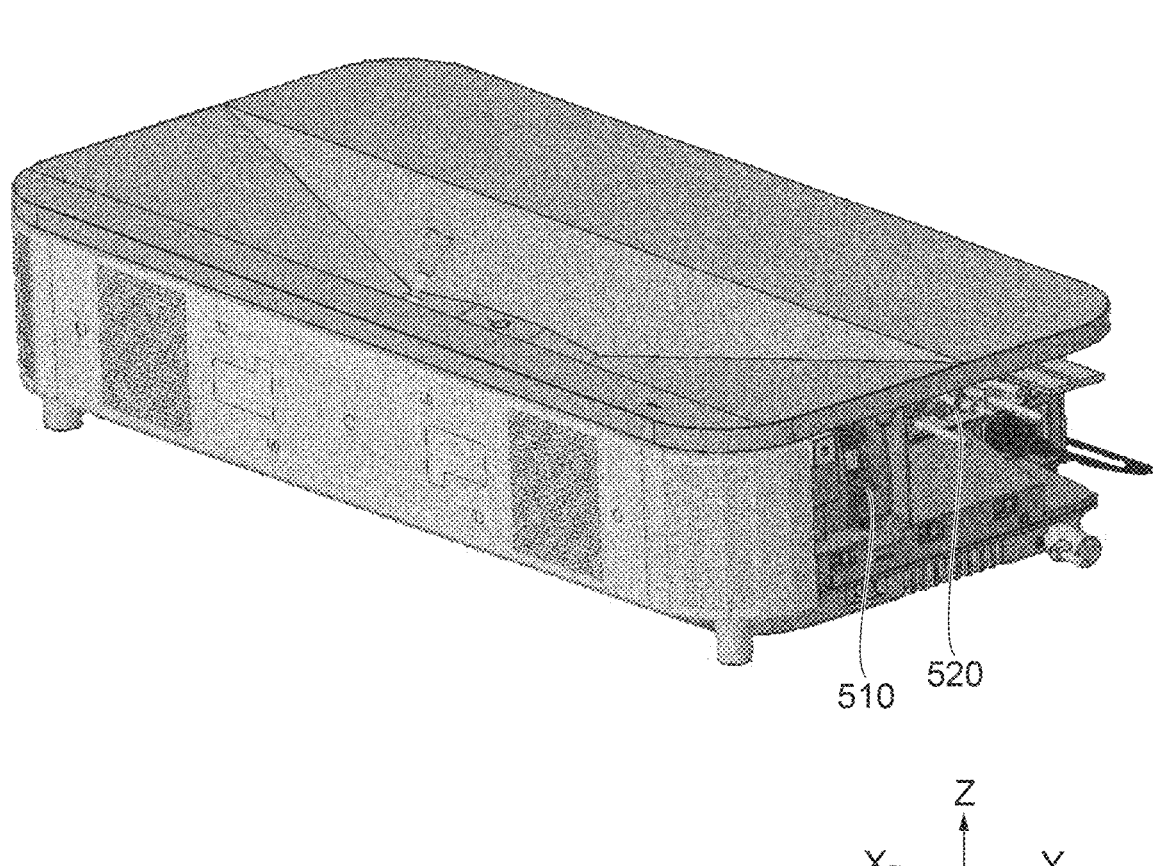
FIG. 6 is a perspective view showing a state where a cover of the projector is removed.

As shown in FIG. 6, the cover 400 covers a focus lever 510 and a coupling terminal 520 or the like. The focus lever 510 moves the position of the lens group 204a of the projection optical unit 204. The coupling terminal 520 is electrically coupled to a cable transmitting an electrical signal.

The cover 400 covers the focus lever 510 and the coupling terminal 520 or the like in this way and therefore can hide the wiring part, which tends to be disorderly, and thus can improve the design of the exterior.

The configuration of the first wall section 101 (also referred to as the operation unit 101), where operation functions are gathered, will now be described with reference to FIGS. 7 and 8.

Figure 7:
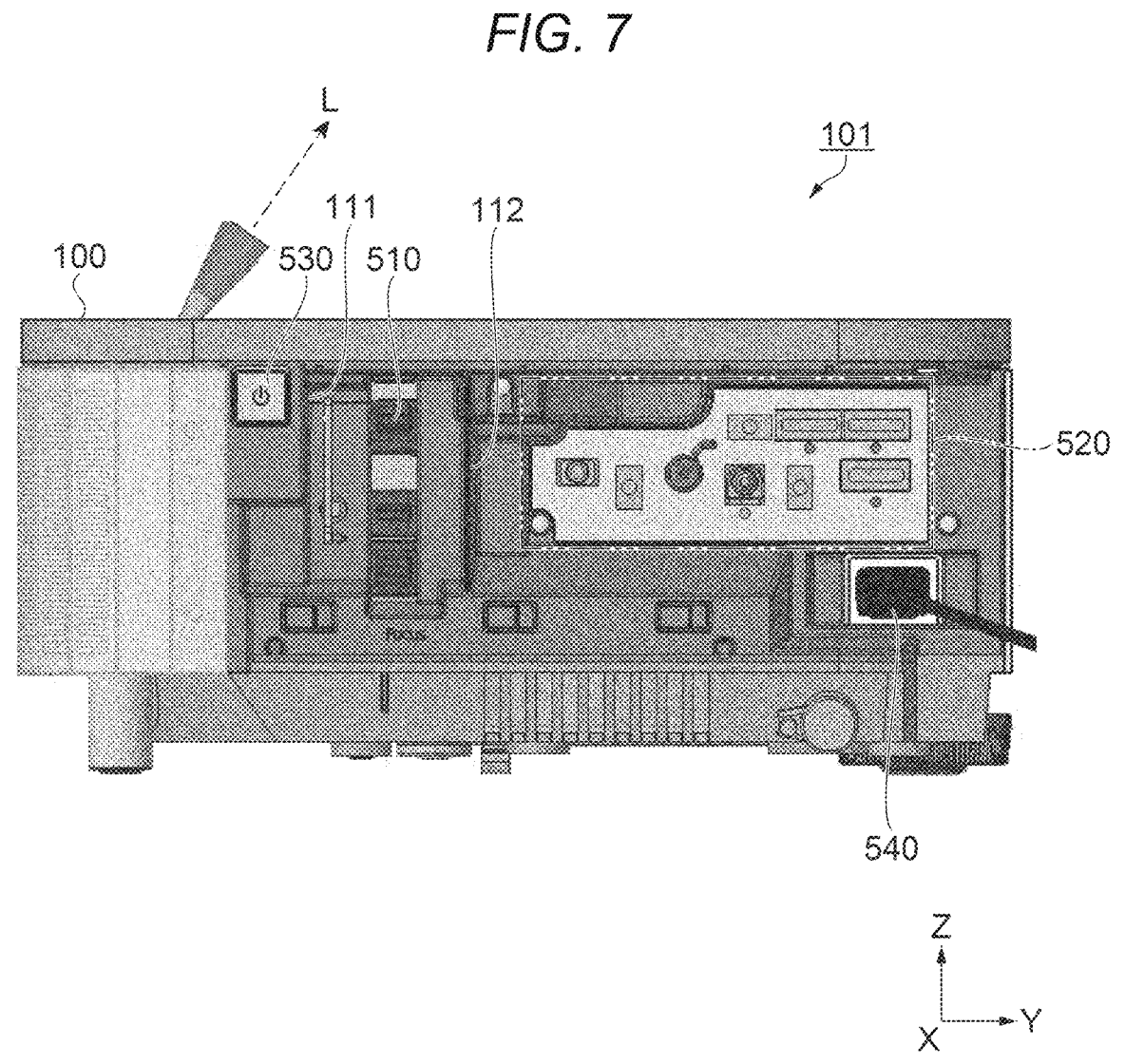
Figure 8:
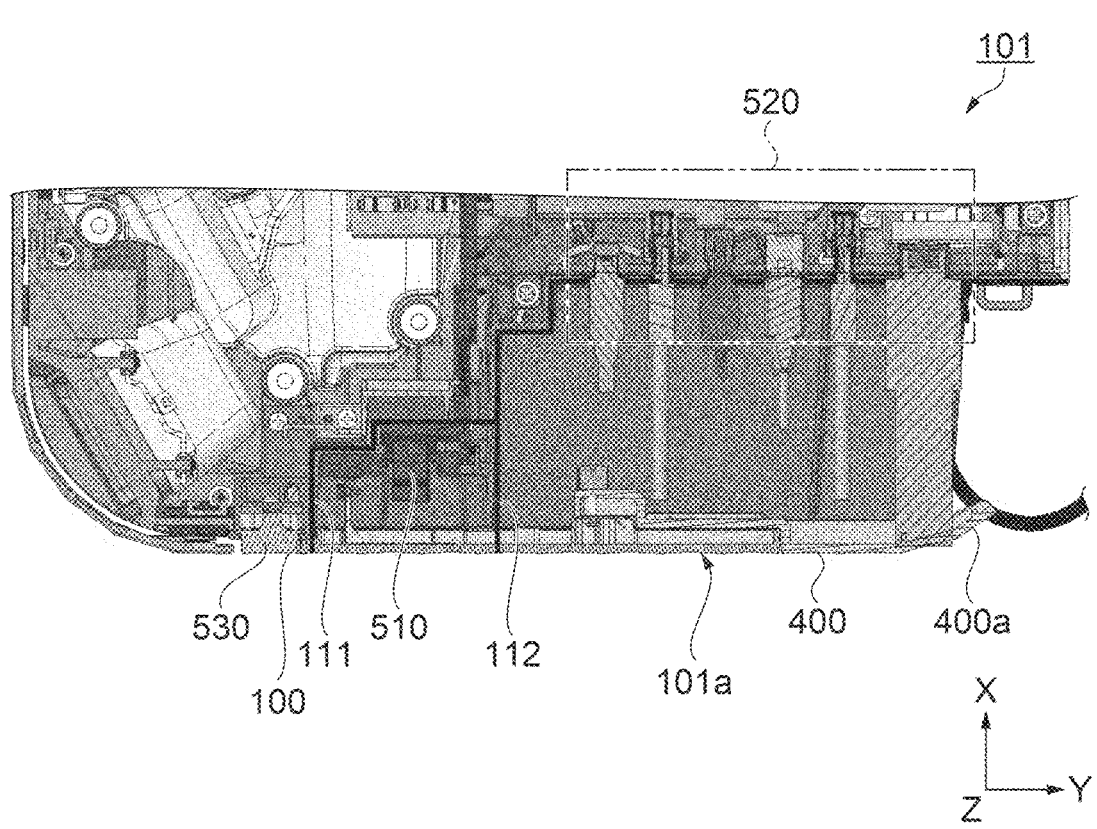
FIG. 8 is a plan view showing the configuration of the operation unit as viewed from above.

As shown in FIGS. 7 and 8, a power switch 530 as a press button, the focus lever 510, the coupling terminal 520, and a power cable coupling terminal 540 are arranged at the first wall section 101.

The press button is not limited to the power switch 530. A press button that is pressed to generate a control signal may be employed. Such a press button may be, for example, a menu button, a home button or the like. The menu button and the home button may also be operated by a remote controller. The coupling terminal 520 is a terminal coupled to an external device and may be, for example, a service terminal, a DC OUT terminal, a headphone terminal, a USB terminal, an HDMI terminal, an optical OUT terminal or the like.

As shown in FIG. 8, the first wall section 101 has a face where the power switch 530 is arranged, a first recess 111 recessed toward the inside of the exterior casing 100, and a second recess 112 recessed toward the inside by a greater amount than the first recess 111. The focus lever 510 is arranged in the first recess 111. The coupling terminal 520 is arranged in the second recess 112.

The focus lever 510 is arranged in the first recess 111 in this way and therefore can be restrained from protruding from an end surface 101a of the first wall section 101. Also, the coupling terminal 520 is arranged in the second recess 112 and therefore can be restrained from largely protruding from the end surface 101a of the first wall section 101 even when a coupling cable is coupled to the coupling terminal 520. Thus, the design can be improved.

The focus lever 510, the power switch 530, the coupling terminal 520 and the like are arranged at the first wall section 101. In other words, the focus lever 510 and the like, which the user uses frequently, are concentrated at one face of the exterior casing 100. Therefore, user-friendliness can be improved, compared with the case where these components are distributed to and arranged at a plurality of wall sections.

The first wall section 101 is a wall section intersecting the second wall section 102, the third wall section 103, and the fourth wall section 104. In other words, the first wall section 101 is a side face of the exterior casing 100 facing the projection surface 300. Therefore, the user can access the first wall section 101 even during projection. Also, since the exterior casing 100 of the short focus projector 1000 is close to the projection surface 300, the first wall section 101 being the side face of the exterior casing 100 improves user-friendliness. In addition, since the side face of the exterior casing 100 is the first wall section 101, the operation unit 101 can be made less visible to a viewer viewing the projection surface 300 and the design of the exterior can be improved.

The positional relationship between the first wall section 101 and the cover 400 will now be described with reference to FIGS. 9 to 12.

Figure 9:
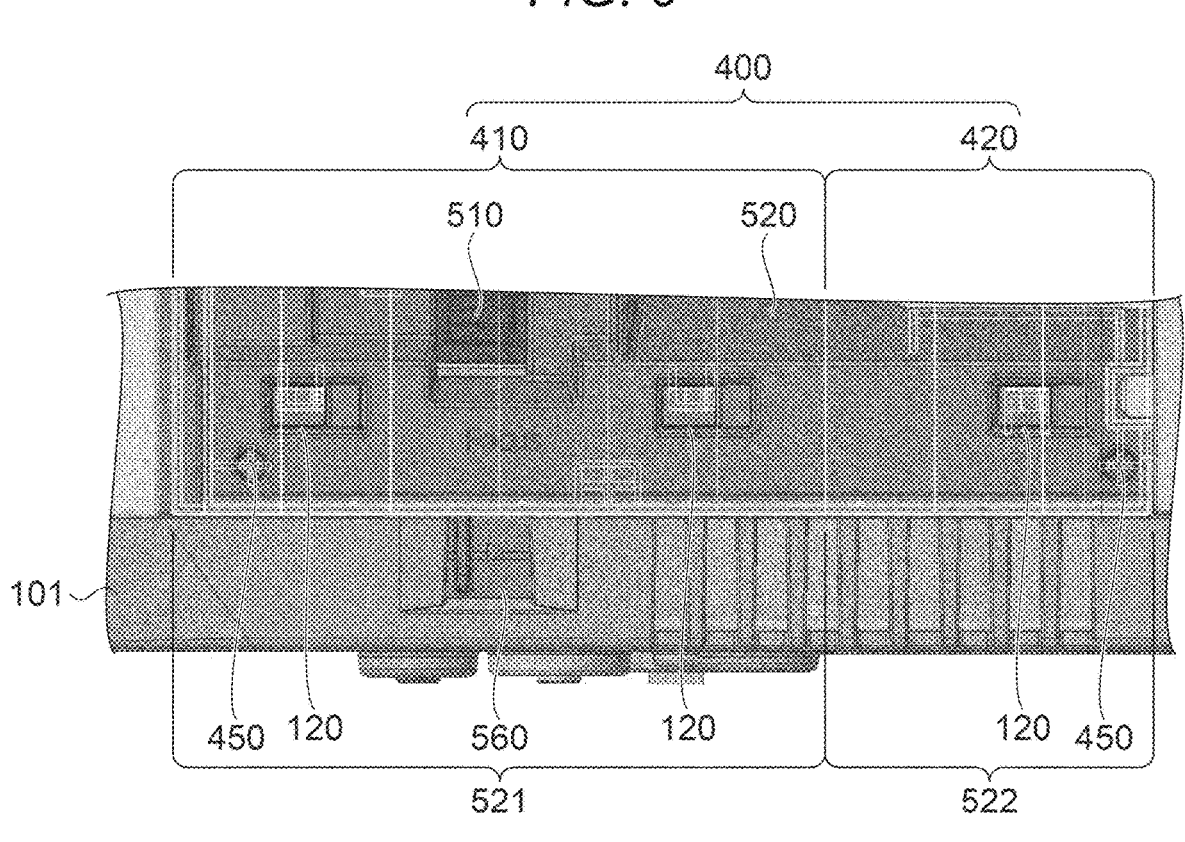
FIG. 9 is a side view showing the positional relationship between the operation unit and the cover.
Figure 10:
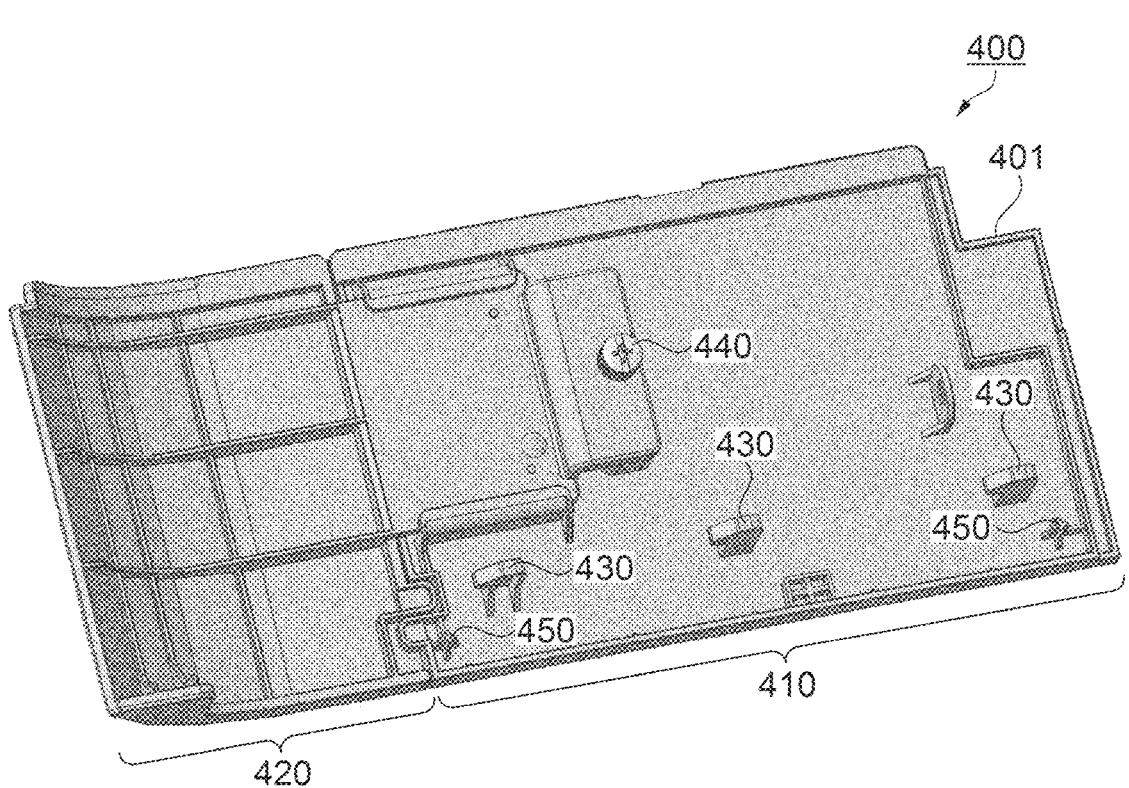
FIG. 10 is a perspective view showing the configuration of the cover.

As shown in FIG. 9, the cover 400 covering the focus lever 510, the coupling terminal 520 and the like is arranged at the first wall section 101. As shown in FIGS. 9 and 10, the cover 400 has a first cover 410 and a second cover 420 removably coupled to the first cover 410.

The first cover 410 covers the focus lever 510 and a first part 521 of the coupling terminal 520. The second cover 420 covers a second part 522 of the coupling terminal 520, excluding the first part 521.

Specifically, the first cover 410 covers the focus lever 510 and a part of the coupling terminal 520. The second cover 420 covers the other parts of the coupling terminal 520. The first cover 410 can be fixed to the exterior casing 100 in a state where the second cover 420 is detached.

As shown in FIG. 10, the first cover 410 and the second cover 420 are fixed with a screw 440 having a knob that can be turned with fingers. As shown in FIG. 8, one end side 400a of the cover 400 is cut out to provide a space between the cover 400 and the exterior casing 100. Thus, even when the cover 400 is attached to the exterior casing 100, a power cable and a cable coupled to an external device can be drawn outward.

The power switch 530 is not covered by the cover 400 and is exposed. The cover 400 can be smoothly fixed to the exterior casing 100 by having two positioning pins 450 inserted into holes provided in the exterior casing 100.

Figure 11:
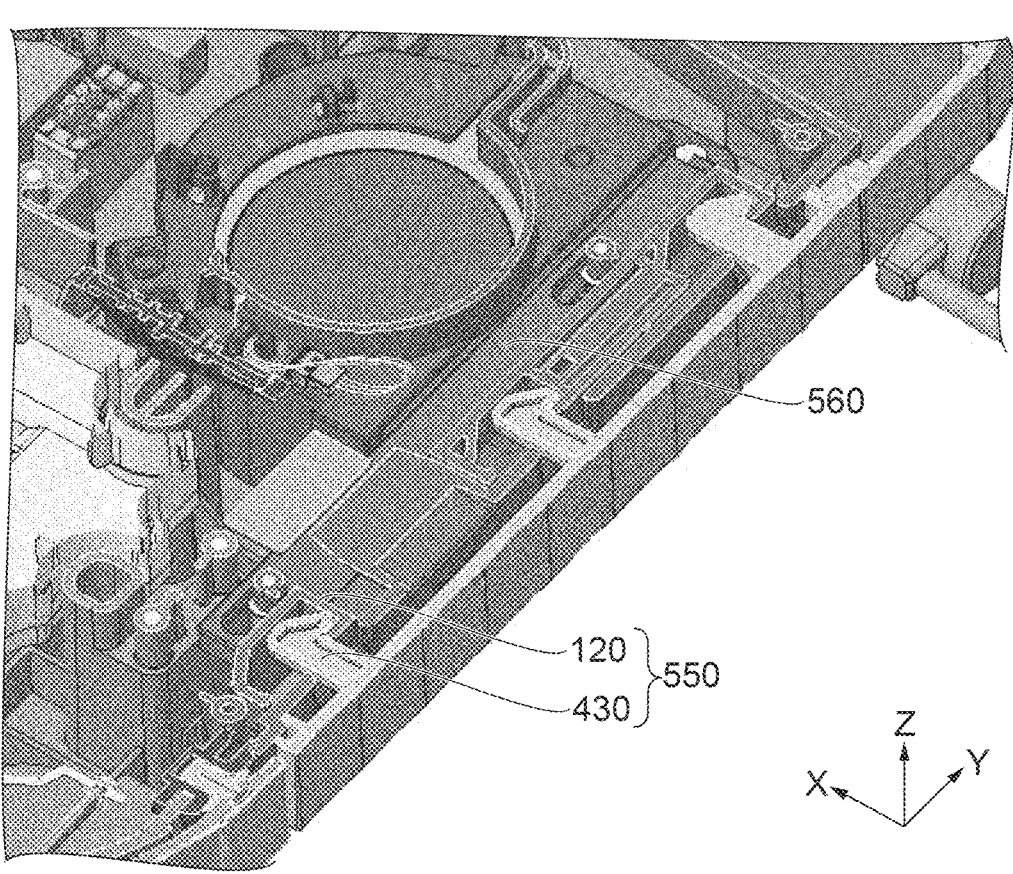
FIG. 11 is a perspective view showing the positional relationship between the operation unit and the cover.
Figure 12:
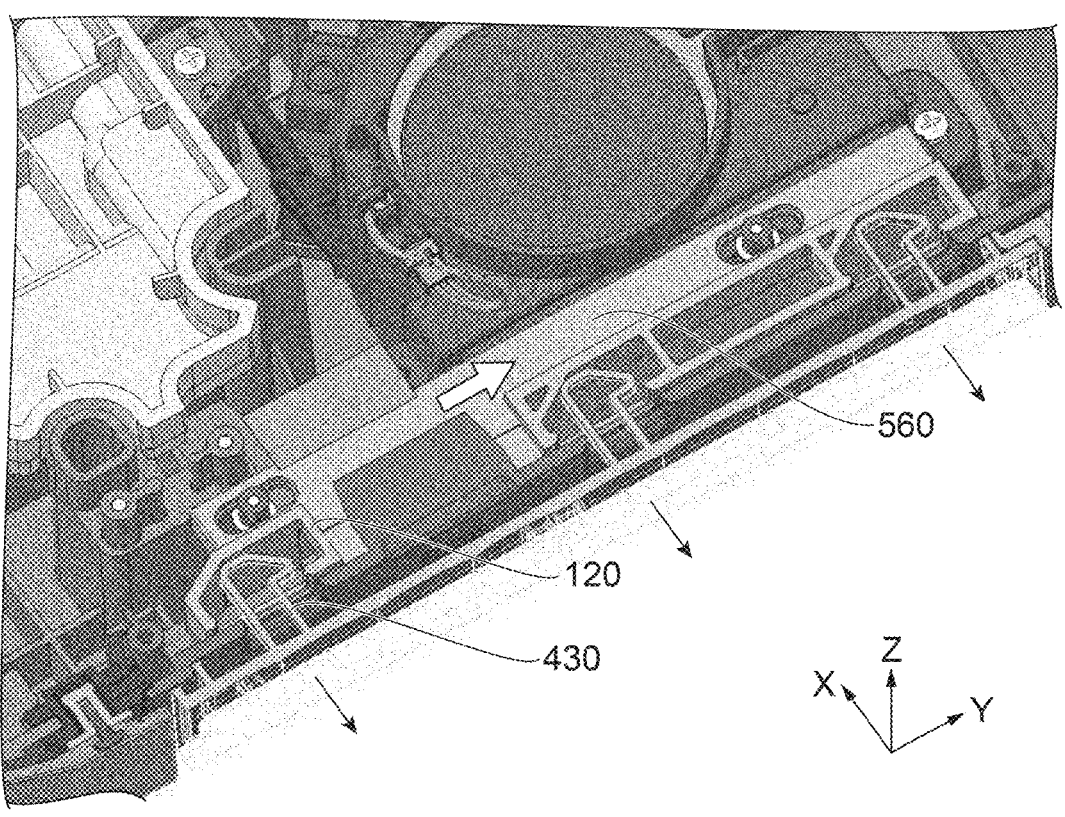
FIG. 12 is a perspective view showing the positional relationship between the operation unit and the cover.

As shown in FIGS. 11 and 12, the cover 400 is attached to the exterior casing 100 via a coupling unit 550. Specifically, the cover 400 is provided with, for example, three hooks 430. The exterior casing 100 is provided with, for example, three recesses 120. The hooks 430 fit in the recesses 120, thus fixing the cover 400 to the exterior casing 100.

To remove the cover 400 from the exterior casing 100, an operation lever 560 is slid in the +Y-direction, as shown in FIG. 9. Thus, the hooks 430 are released from the recesses 120 and the cover 400 can be removed from the exterior casing 100, as shown in FIG. 12.

As described above, the cover 400 has the first cover 410 and the second cover 420. Therefore, one cover of the first cover 410 and the second cover 420 can be opened to perform an operation and the other cover can be left closed. Thus, contact with a part that is not operated can be prevented and an erroneous operation can be restrained. Also, since the first wall section 101 is not exposed in its entirety at the time of operation, the design of the exterior can be improved.

Also, the removable second cover 420 covers a part of the coupling terminal 520. Therefore, even when an external device protruding by a large amount is coupled to the coupling terminal 520, the second cover 420 can be detached from the first cover 410, leaving the first cover 410 attached to the exterior casing 100. Thus, the design of the exterior can be improved.

The configuration of the focus lever 510 will now be described with reference to FIGS. 13 and 14.

Figure 13:
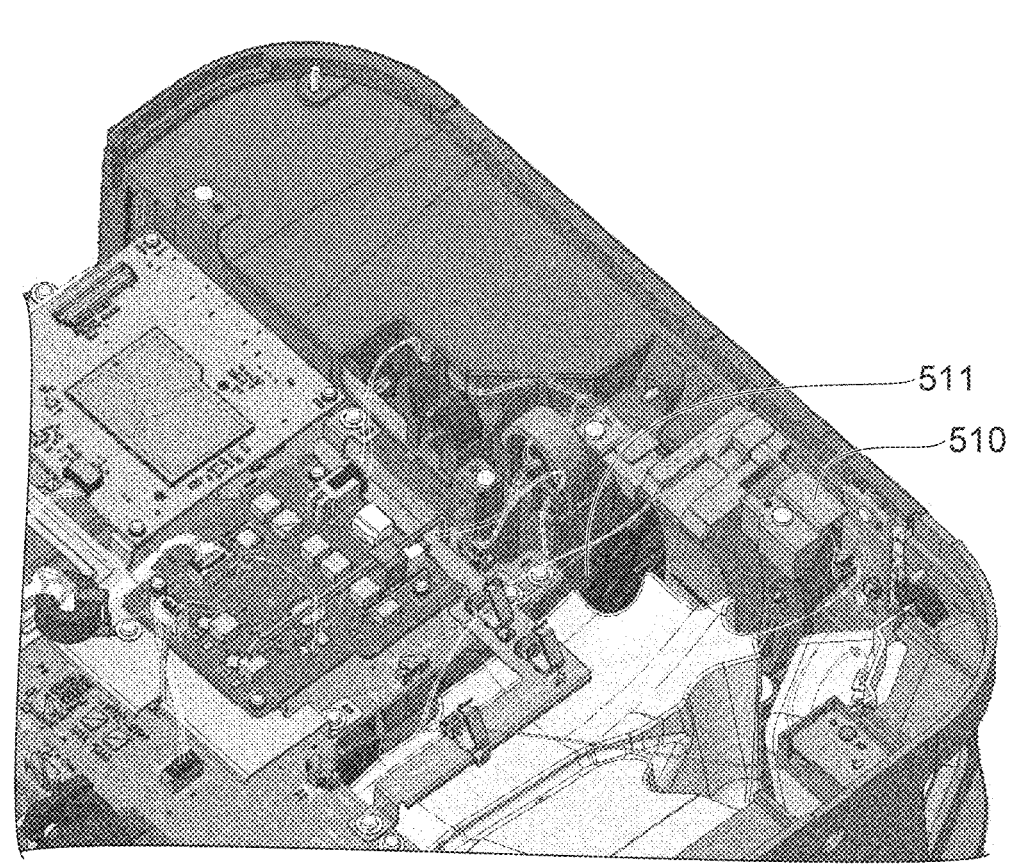
FIG. 13 is a perspective view showing the configuration of a focus lever.
Figure 13:
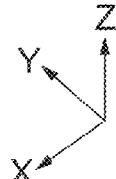
Figure 14:
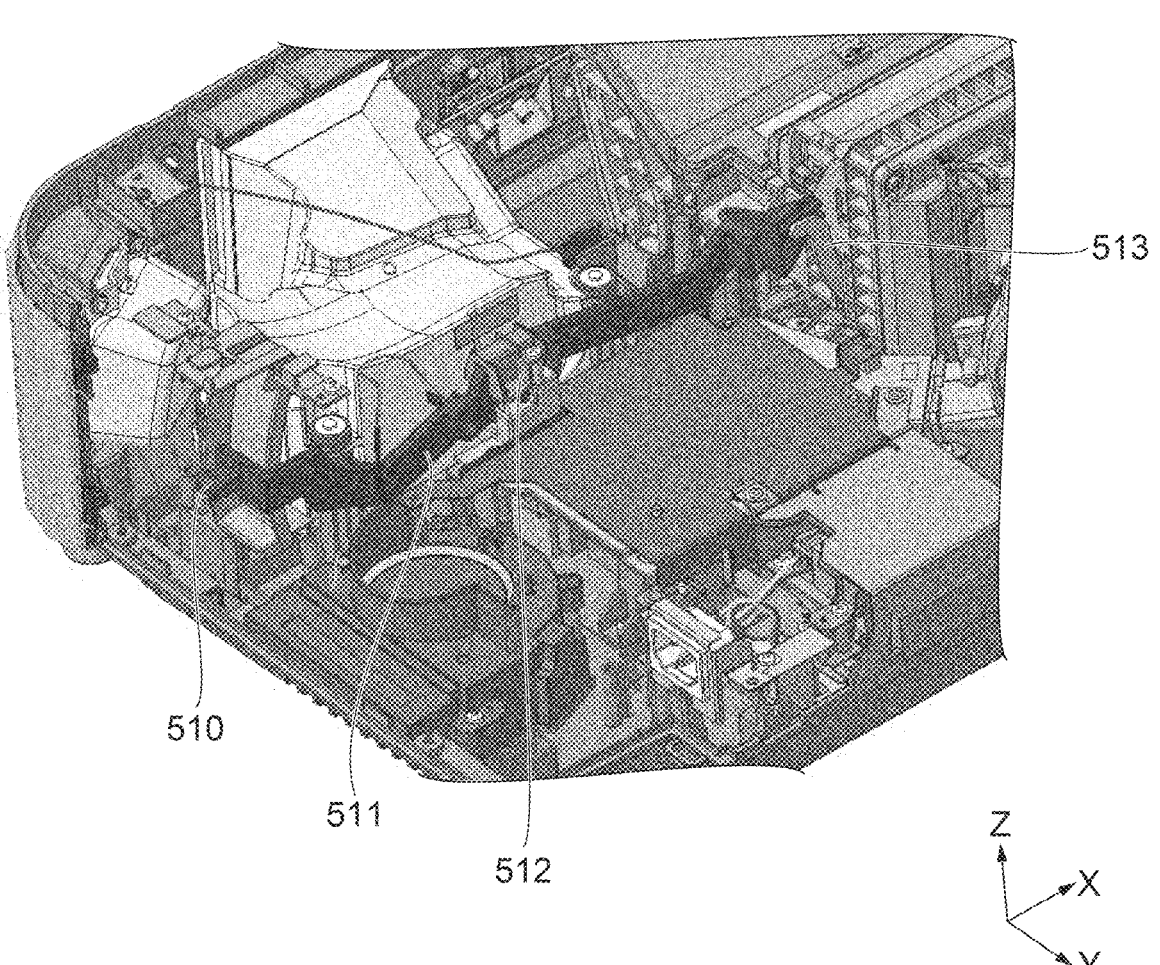
FIG. 14 is a perspective view showing the configuration of the focus lever.

As shown in FIGS. 13 and 14, the focus lever 510 is linked to a coupling part 511. The coupling part 511 is coupled to a focus ring rotation lever 513 via a hinge 512.

As the focus lever 510 is moved in up and down directions, the focus ring rotation lever 513 moves in up and down directions via the coupling part 511, and the lens group 204*a* linked to the focus ring rotation lever 513 can thus be slid.

As described above, the projector 1000 according to the embodiment includes: the exterior casing 100 having the first wall section 101; the projection optical unit 204 accommodated in the exterior casing 100 and having the lens group 204*a* projecting the image light L onto the projection surface 300; the focus lever 510 moving the position of the lens group 204*a*; the power switch 530 being pressed to generate a control signal; and the coupling terminal 520 electrically coupled to a cable transmitting an electrical signal. The focus lever 510, the power switch 530, and the coupling terminal 520 are arranged at the first wall section 101.

In this configuration, the focus lever 510, the power switch 530, and the coupling terminal 520 are arranged at the first wall section 101. In other words, the focus lever 510 and the like, which the user uses frequently, are concentrated at one face of the exterior casing 100. Therefore, user-friendliness can be improved, compared with the case where these components are distributed to and arranged at a plurality of wall sections.

In the projector 1000 according to the embodiment, the first wall section 101 may have the recesses 111, 112 recessed toward the inside of the exterior casing 100, and at least the coupling terminal 520 may be arranged in the recesses 111, 112. In this configuration, the coupling terminal 520 is arranged in the recesses 111, 112. Therefore, even when an external device or a coupling cable that protrudes by a large amount is coupled to the coupling terminal 520, the amount of protrusion from the projector 1000 can be restrained and the design can be improved.

The projector 1000 according to the embodiment may have the cover 400 covering at least the focus lever 510 and the coupling terminal 520. In this configuration, the cover 400 covers the focus lever 510 and the coupling terminal 520. Therefore, a part which tends to be disorderly can be hidden and the design of the exterior can thus be improved.

In the projector 1000 according to the embodiment, the cover 400 may have the first cover 410 covering at least the focus lever 510 and the first part 521 of the coupling terminal 520, and the second cover 420 removably coupled to the first cover 410 and covering the second part 522 excluding the first part 521. In this configuration, the first cover 410 and the second cover 420 are provided. Therefore, one cover of the first cover 410 and the second cover 420 can be opened to perform an operation and the other cover can be left closed. Thus, contact with a part that is not operated can be prevented and an erroneous operation can be restrained. Also, since the first wall section 101 is not exposed in its entirety at the time of operation, the design of the exterior can be improved.

In the projector 1000 according to the embodiment, the first cover 410 may be able to be fixed to the exterior casing 100 in a state where the second cover 420 is detached, and may cover the focus lever 510, and the second cover 420 may cover the coupling terminal 520. In this configuration, the removable second cover 420 covers the coupling terminal 520. Therefore, even when an external device protruding by a large amount is coupled to the coupling terminal 520, the second cover 420 can be detached from the first cover 410, leaving the first cover 410 attached to the exterior casing 100. Thus, the design of the exterior can be improved.

In the projector 1000 according to the embodiment, the first cover 410 may have a cut-out 401 at an end part in the −Y-direction. The power switch 530 may be exposed from the cut-out 401 when the first cover 410 is fixed to the exterior casing 100 in such a way as to cover the focus lever 510. A press surface of the power switch 530 may be flush with an outer surface of the first cover 410 when the first cover 410 is fixed to the exterior casing 100.

In this configuration, since the focus lever 510 is covered with the first cover 410, the appearance of the exterior can be improved. Also, as the power switch 530 is exposed from the cut-out 401, the user can access the power switch 530, which the user accesses most frequently, even in the state where the first cover 410 is fixed to the exterior casing 100. Thus, user-friendliness can be improved.

Moreover, since the outer surface of the first cover 410 and the power switch 530 are flush with each other, an erroneous operation can be restrained and the appearance of the exterior can be improved, compared with the case where the power switch 530 protrudes from the outer surface of the first cover 410. Also, since the outer surface of the first cover 410 and the power switch 530 are flush with each other, the user can easily access the power switch 530 and operability is thus improved, compared with the case where the power switch 530 is recessed from the outer surface of the first cover 410. Being flush includes slight differences such as tolerance.

In the projector 1000 according to the embodiment, the first wall section 101 may be a wall section excluding a face facing the projection surface 300, of the exterior casing 100. In this configuration, the first wall section 101 is a wall section excluding the face facing the projection surface 300, and the coupling terminal 520 and the like are concentrated at the first wall section 101. Therefore, user accessibility can be improved even during the projection by the projector 1000. Thus, user-friendliness can be improved. Also, since the first wall section 101 is a wall section in a different direction from the direction of projection, the entry of light into the eyes can be restrained.

In the projector 1000 according to the embodiment, the projection optical unit 204 may be a short focus type. The exterior casing 100 may have the second wall section 102 facing the projection surface 300, the third wall section 103 opposite to the second wall section 102, and the fourth wall section 104 facing the installation surface 301, where the exterior casing 100 is installed. The first wall section 101 may be a wall section intersecting the second wall section 102, the third wall section 103, and the fourth wall section 104. In this configuration, the first wall section 101 is a wall section intersecting the second wall section 102, the third wall section 103, and the fourth wall section 104. In other words, the first wall section 101 is the side face of the exterior casing 100 facing the projection surface 300. Therefore, the user can access the first wall section 101 even during projection. Also, since the exterior casing 100 of the short focus projector 1000 and the projection surface 300 are close to each other, the first wall section 101 being the side face of the exterior casing 100 improves user-friendliness. In addition, since the side face of the exterior casing 100 is the first wall section 101, the operation unit 101 can be made less visible to a viewer viewing the projection surface 300 and the design of the exterior can be improved.

Modification example of the foregoing embodiment will now be described.

As described above, the cover 400 is not limited to an attachable-removable type and may be an open-close type.

The exterior casing 100 is not limited to a quadrilateral shape and may be cylindrical. When the side face of the exterior casing 100 has no corners in this way, a part of the side face serves as the first wall section 101.

What is claimed is:

1. A projector comprising:

an exterior casing having a plurality of wall sections including a first wall section;

a projection part accommodated in the exterior casing and having a lens group projecting image light onto a projection surface;

a focus lever moving a position of the lens group;

a press button being pressed to generate a control signal;

a coupling terminal electrically coupled to a cable transmitting an electrical signal; and a cover covering at least the focus lever and the coupling terminal, wherein the focus lever, the press button, and the coupling terminal are arranged at the first wall section,

the cover has a cut-out exposing the press button in a state of covering the focus lever and the coupling terminal, and the press button is flush with an outer surface of the cover.

2. The projector according to claim 1, wherein the first wall section has a recess recessed toward inside of the exterior casing, and the coupling terminal is arranged in the recess.

3. The projector according to claim 1, wherein the cover has a first cover covering at least one of the focus lever and the coupling terminal and a part of the other, and a second cover removably coupled to the first cover and covering another part of the other.

4. The projector according to claim 3, wherein the first cover is configured to be fixed to the exterior casing in a state where the second cover is detached, and covers the focus lever, and the second cover covers the coupling terminal.

5. The projector according to claim 1, wherein the first wall section is provided at a position of the plurality of wall sections of the exterior casing, which position is other than at a second wall section facing the projection surface.

6. The projector according to claim 5, wherein the projection part is a short focus type, the plurality of wall sections include the second wall section, a third wall section opposite to the second wall section, and a fourth wall section facing an installation surface where the exterior casing is installed, and the first wall section is a wall section intersecting the second wall section, the third wall section, and the fourth wall section.

\* \* \* \* \*